(No Model.)  3 Sheets—Sheet 1.
N. H. DAVIS.
COMBINED COTTON SEED PLANTER AND FERTILIZER DISTRIBUTER.
No. 305,804. Patented Sept. 30, 1884.

WITNESSES
F. L. Ourand
J. Heylmun

INVENTOR
Nathan H. Davis.
By A. G. Heylmun,
Attorney (No Model.) 3 Sheets—Sheet 2.
N. H. DAVIS.
COMBINED COTTON SEED PLANTER AND FERTILIZER DISTRIBUTER.
No. 305,804. Patented Sept. 30, 1884.
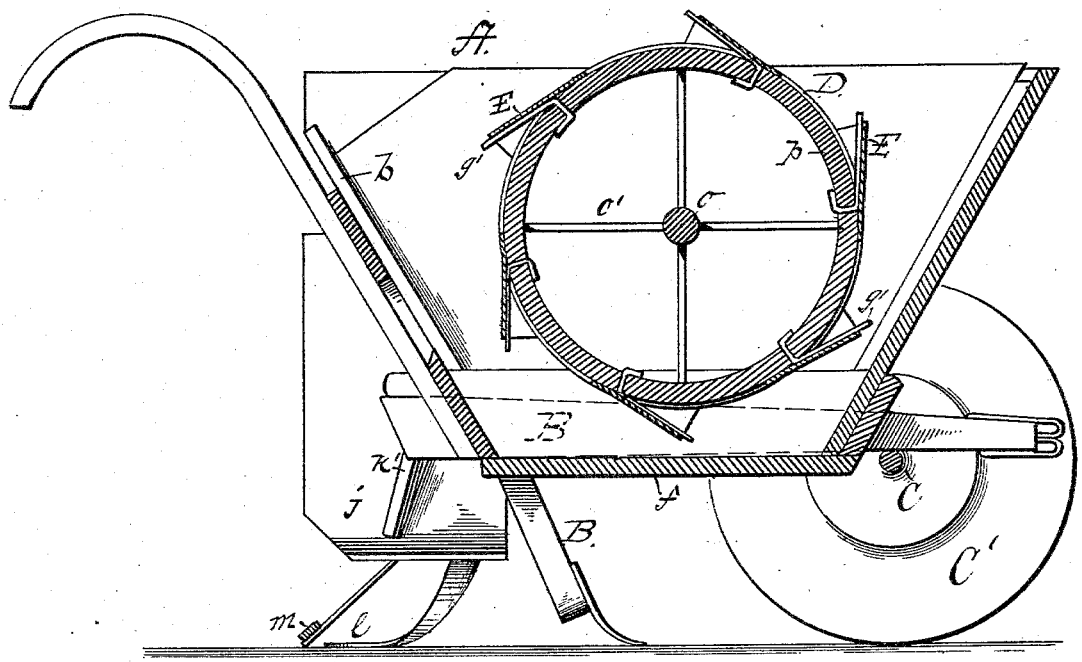
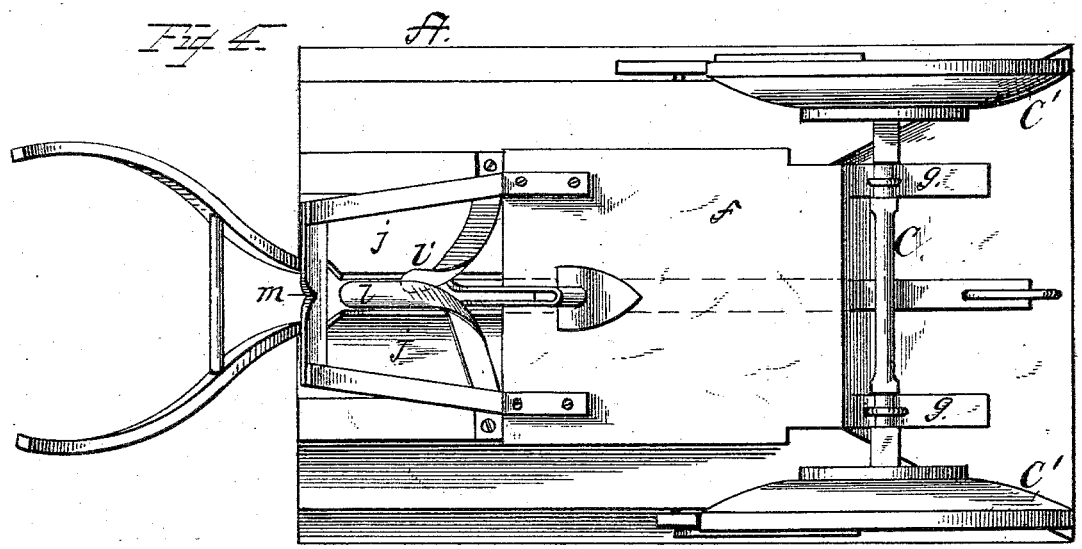
WITNESSES
F. L. Ourand
J. Heylmun
INVENTOR
Nathan H. Davis
by A. G. Heylmun
Attorney.

UNITED STATES PATENT OFFICE.

NATHAN H. DAVIS, OF GREENVILLE, S. C., ASSIGNOR OF TWO-THIRDS TO JAMES C. FURMAN AND SAMUEL STRADLEY, BOTH OF SAME PCLAE.

COMBINED COTTON-SEED PLANTER AND FERTILIZER-DISTRIBUTER.

SPECIFICATION forming part of Letters Patent No. 305,804, dated September 30, 1884.

Application filed December 12, 1883. (No model.)

*To all whom it may concern:*

Be it known that I, NATHAN H. DAVIS, a citizen of the United States of America, resident of Greenville, in the county of Greenville and State of South Carolina, have invented a new and useful Cotton-Seed Planter and Fertilizer-Distributer, of which the following is a specification.

My invention relates to improvements in combined cotton-seed planters and fertilizer-distributers; and the object is to provide a machine of the character stated which will contain all the requisite mechanical essentials in the simplest forms and perform the work in a satisfactory and complete manner.

My invention therefore consists in a hopper or reservoir for a cotton-seed planter and fertilizer-distributer having a central longitudinal passage at the base of the hopper, extending the length thereof, adapted to receive a plow-beam.

My invention further consists in a hopper or reservoir having a longitudinal passage at the base thereof extending the length of the machine, and adapted to receive a plow-beam, and divided longitudinally into two compartments, the rear end of each compartment being provided with an aperture for the escape of the contents of the reservoir, and having the side boards on the outside of the hopper extended rearward and downward beyond the rear end board of the hopper, and provided with guiding-cleats arranged for directing the discharged material in reverse directions, but on the same line.

My invention further consists in a seed-planter and fertilizer-distributer carrying wheels formed with pockets or cups arranged on its circumferential face, said pockets being provided with projecting fingers or stirrers, as hereinafter stated.

My invention further consists in the novel construction and combination of parts, as will be hereinafter more fully set forth and specifically claimed.

Figure 1:
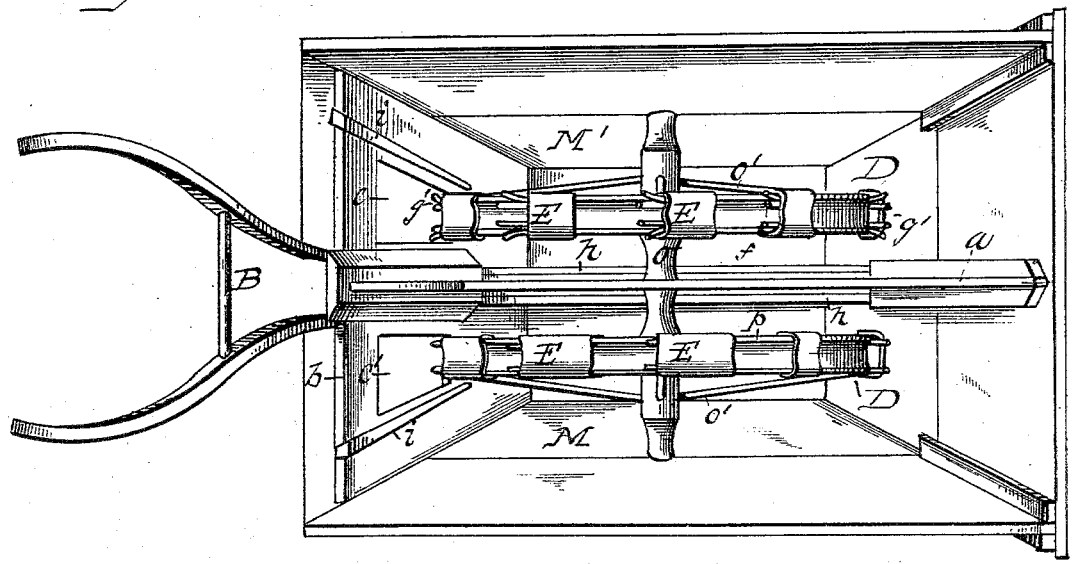
Figure 2:
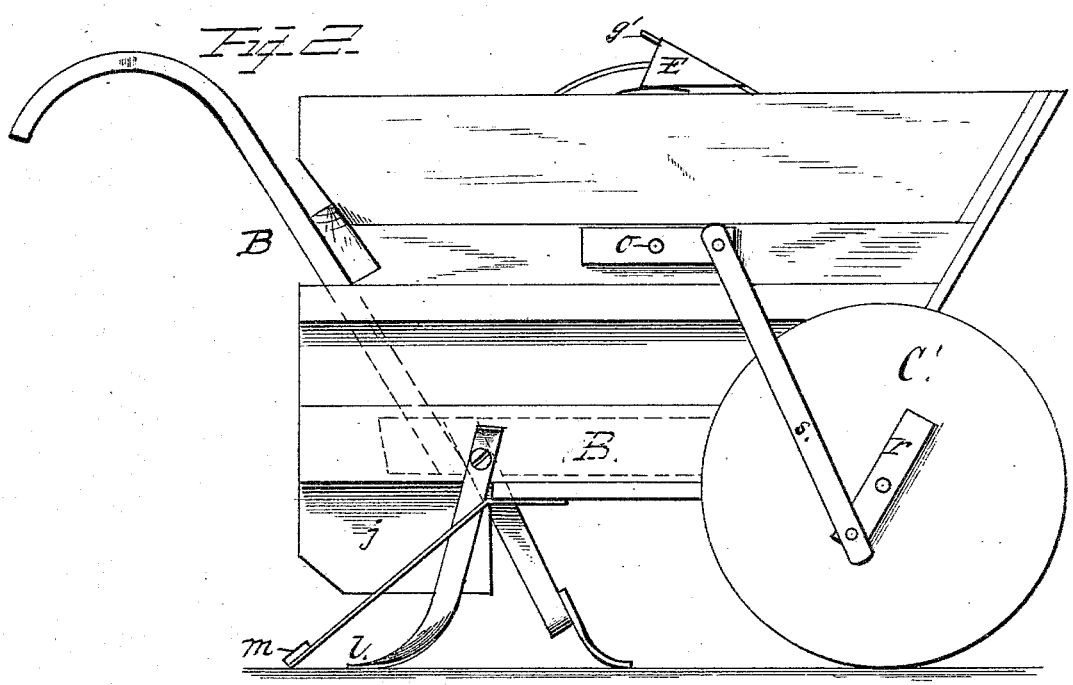
Figure 5:
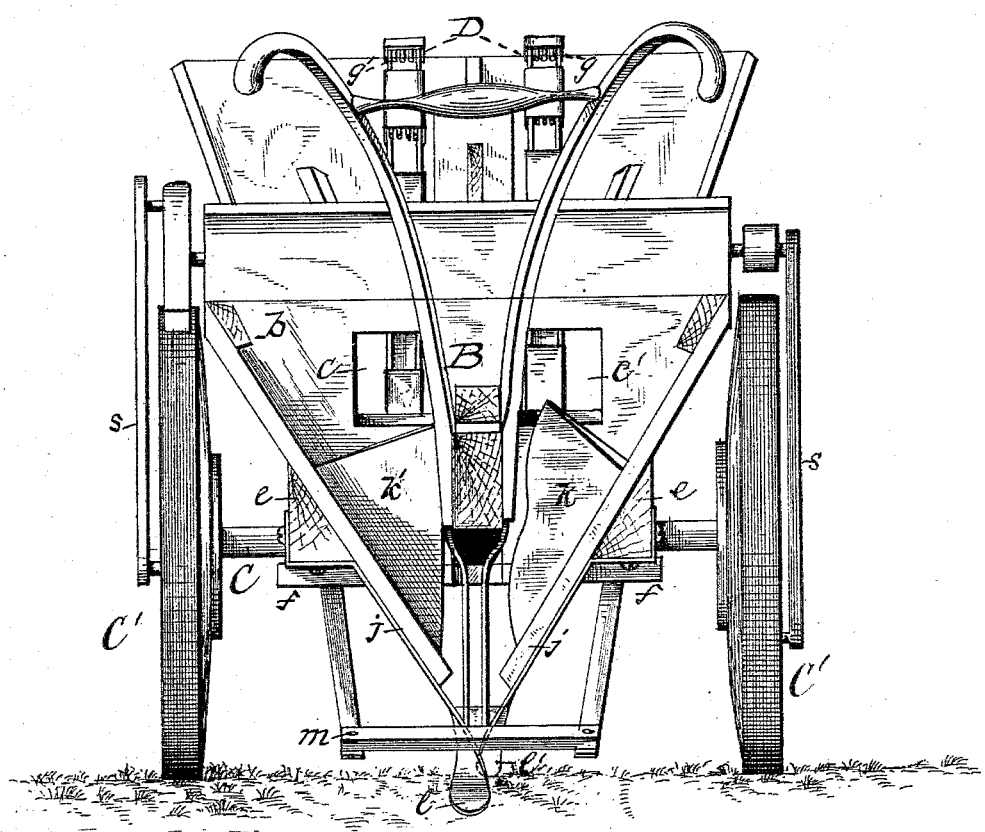

In the accompanying drawings, forming a part of this specification, Figure 1 is a plan view showing the interior of the hoppers and the arrangement of the seed and fertilizer wheels therein. Fig. 2 is a side view showing the plow-beam inserted. Fig. 3 is a longitudinal vertical sectional view. Fig. 4 is a view of the bottom of the machine, and Fig. 5 is an end view showing the construction of the rear part of the machine.

A represents an oblong hopper or reservoir for containing the seed and fertilizer. It is substantially built, and consists of inclined sides and ends, the side pieces of which are provided with journal-bearings to carry the seed and fertilizer wheels, and has a partition, $a$, dividing the hopper into two compartments, the one to receive the fertilizing material and the other the seed. The rear end board, $b$, of the hopper has two apertures, $c$ $c'$, through which the contents of the hoppers are ejected or deposited during the operation and progress of the machine. Secured to each side of the hopper is a triangular rib or sill, $e$, to which is secured the bottom $f$ of the hopper, the sills $e$ being somewhat extended in the front, as at $g$, to serve as bearings for the axle of the carrying-wheels.

Above the bottom and extended centrally the length of the hopper, is a box, $h$, the inner walls of which are connected with the bottom of the hopper, and form a passage adapted to have loosely and detachably passed through it the beam of a plow, substantially as shown. Secured to the inner face of the rear end board of the hopper are guiding-cleats $i$, arranged on a line with the outer edge of the apertures in the hopper. The sides of the hopper are extended rearward and downward beyond the rear end board, as at $j$, until they nearly meet, or so that the contents of the hopper may be directed to a line through the interstices between them; and on the outside, secured to the inner face of these extensions of the side boards of the hopper, are two guiding-cleats, $k$ $k'$, the former of which is fixed to the side of the hopper in which the fertilizer is carried, and is arranged to direct the fertilizer directly behind the plow and into the furrows made by it, and the latter is fixed on the side of the hopper in which the seed is carried, and is arranged to direct the course of the seed behind the pressed furrows made by the scraper, as hereinafter stated. The relative arrangement of these cleats $k$ and $k'$ is to direct the material coursing down on the same direct line, but at different points therein. Secured to each of the rear extensions of the sides are two scrapers or coverers, consisting of flat metallic strips $l$ $l'$. These scrapers or coverers are so adjusted that they draw the dirt into the furrows over the fertilizer deposited therein, and one of them, *l*, extends backward, the end being twisted so that the flat side presses on the ground and leaves a shallow furrow or track, into which the seeds drop, being directed by the inclined cleat, and are covered, in the usual way, either by a drag-board, *m*, attached, or by small plow-pointed colters secured to the rear part of the machine in any suitable manner.

B represents the plow, which may be of any suitable kind to trace the furrow, and having a comparatively straight beam adapted to pass through the passage in the body of the hopper intended for that purpose. The beam of the plow should extend front beyond the end of the passage, and above and across the axle of the wheels C, to afford room for the play of the clevis, and so as to give room for the horse in front of the wheels. The passage for the beam of the plow should be large enough vertically to give free play to the end of the beam up and down, so that the plow will not be raised by the driving-wheels, but will make an even, straight furrow, and as deep as may be desired for the fertilizer.

C' represents driving-wheels having their axle *n* journaled to the front extensions of the side rails or sills of the hopper in any suitable manner.

D represents the wheels carrying the seed and fertilizer cups. These wheels are fixed to a single axle, *o*, journaled in the hopper, substantially as shown. These wheels are preferably made with arms *o'*, having fitted thereto a circumferential rim, *p*, on which, at stated distances, are arranged and secured the fertilizer and seed cups E, which are made of metal and of suitable capacity for the purpose intended, and have rigidly secured in them against their outer side stirrers or fingers *g'*, the purpose of which is to continually stir and agitate the contents of the hopper when passed through them during the operation of the machine. On each end of the axle-bearings of these wheels is secured a crank-arm, *r*, to which in turn is secured one end of a connecting-rod, *s*, the other end of which is fastened to the wheel. The wheels D are so arranged and disposed in the hopper that the seed and fertilizer carried by the cups shall be dropped through the aperture in the rear end of the hopper.

In the drawings, Fig. 1, the seed compartment is indicated by the letter M' and the fertilizer by the letter M.

The operation of the machine may be stated as follows: The hoppers being supplied with seeds and fertilizer and the progression commenced, the wheels in the hoppers are caused to turn, taking up the seed and fertilizer from the bottom of the hoppers in the cups on the rims of the wheels, and, carrying them up and over, drop the contents behind out through the opening or apertures in the rear end board of the hopper, thence being directed by the guiding-cleats and beveled sides, the fertilizer being carried forward and dropped in the furrow immediately behind the plow, and is there covered by the coverers or scrapers, and the seeds being dropped into the track or shallow furrow formed by the longest coverer by the drag or plow-colter, as heretofore stated.

It will be seen that I have constructed a seed-planter and fertilizer distributer or depositor which can be used as an adjunct or attachment to a common plow, thus providing a machine in which an essential part may be utilized for common tilling purposes independently of the seeding and fertilizing part.

I reserve the right to vary the construction of the machine without departing from the spirit of the invention.

What I claim as my invention, and desire to secure by Letters Patent, is—

1. A detachable hopper or reservoir for a cotton-seed planter and fertilizer-distributer, formed or provided with a central longitudinal passage at the base above the bottom thereof, and extending the length thereof, and adapted to receive a plow-beam, substantially as and for the purpose set forth.

2. The detachable hopper divided longitudinally into two compartments, and formed or provided with a central longitudinal passage at the base thereof above the bottom, and extending the length thereof, and having its rear end piece formed with apertures, and its sides extending rearward and downward, and provided with guiding-cleats, substantially as and for the purpose set forth.

3. A seed or fertilizer carrying wheel provided with pockets or cups on its circumferential face or rim, said pockets being provided with projecting fingers or stirrers, substantially as described.

4. The detachable hopper formed or provided with a central longitudinal passage at the base thereof and above the bottom, in combination with a plow, the beam of which is loosely and detachably lodged in the passage of the hopper, substantially as and for the purpose set forth.

5. In combination, the hopper sustained on wheels at its forward end, and its rear end board formed with apertures, guiding-cleats arranged and secured, as stated, to extensions of the sides of the hopper, the seed and fertilizer wheels constructed with pockets or cups provided with fingers or stirrers, and operatively connected to the driving-wheels, the seed and fertilizer coverers secured to the hopper, and a detachably-connected plow, all arranged to operate substantially as and for the purpose set forth.

In testimony whereof I have hereunto set my hand in the presence of two attesting witnesses.

NATHAN H. DAVIS.

Attest:
SAMUEL M. GREEN,
C. M. FURMAN.